United States Patent [19]
Suda

[11] Patent Number: 5,543,886
[45] Date of Patent: Aug. 6, 1996

[54] FOCUS STATE DETECTION APPARATUS

[75] Inventor: Yasuo Suda, Yokohama, Japan

[73] Assignee: Canon Kabushiki Kaisha, Tokyo, Japan

[21] Appl. No.: 391,100

[22] Filed: Feb. 21, 1995

[30] Foreign Application Priority Data

May 2, 1991 [JP] Japan .................................. 3-130616

[51] Int. Cl.⁶ .................................................. G03B 13/36
[52] U.S. Cl. ........................................... 354/406; 354/408
[58] Field of Search .................................. 354/402, 403, 354/406, 407, 408

[56] References Cited

U.S. PATENT DOCUMENTS

| | | | |
|---|---|---|---|
| 3,953,728 | 4/1976 | Leitz et al. | 354/407 |
| 3,953,863 | 4/1976 | Lang | 354/407 |
| 4,188,102 | 2/1980 | Schaefer | 354/402 |
| 4,429,964 | 2/1984 | Schaefer | 354/403 |
| 4,447,143 | 5/1984 | Heitmann et al. | 354/407 |
| 4,743,932 | 5/1988 | Matsui | 354/407 |
| 4,808,808 | 2/1989 | Karasaki et al. | 354/408 |
| 4,849,782 | 7/1989 | Koyama et al. | 354/408 |
| 4,908,504 | 3/1990 | Karasaki et al. | 354/408 |
| 4,992,818 | 2/1991 | Karasaki et al. | 354/407 |

FOREIGN PATENT DOCUMENTS

| | | |
|---|---|---|
| 58-142306 | 8/1983 | Japan . |
| 59-107313 | 6/1984 | Japan . |
| 60-101513 | 6/1985 | Japan . |
| 63-13010 | 1/1988 | Japan . |
| 63-18314 | 1/1988 | Japan . |
| 64-44906 | 2/1989 | Japan . |
| 1120520 | 5/1989 | Japan . |
| 224616 | 1/1990 | Japan . |

*Primary Examiner*—Russell E. Adams
*Attorney, Agent, or Firm*—Fitzpatrick, Cella, Harper & Scinto

[57] ABSTRACT

A focus detection apparatus provided with a reimaging optical system for forming a pair of secondary objective images capable of changing the relative positions with each other, an iris member having a pair of apertures for controlling the light beam passing through the reimaging optical system, and a condenser lens for projecting the apertures of the iris member onto the exit pupil of the photographing lens. The reimaging optical system is structured by an optical member having the optical axis which is different from the optical axis of the photographing lens in a space between the iris member and the condenser lens, and further, the two apertures which are paired on the iris member have circular arc portions respectively at the furthest positions from the optical axis of the photographing lens, and the centers of the two circular arcs are arranged to be different from each other.

13 Claims, 10 Drawing Sheets

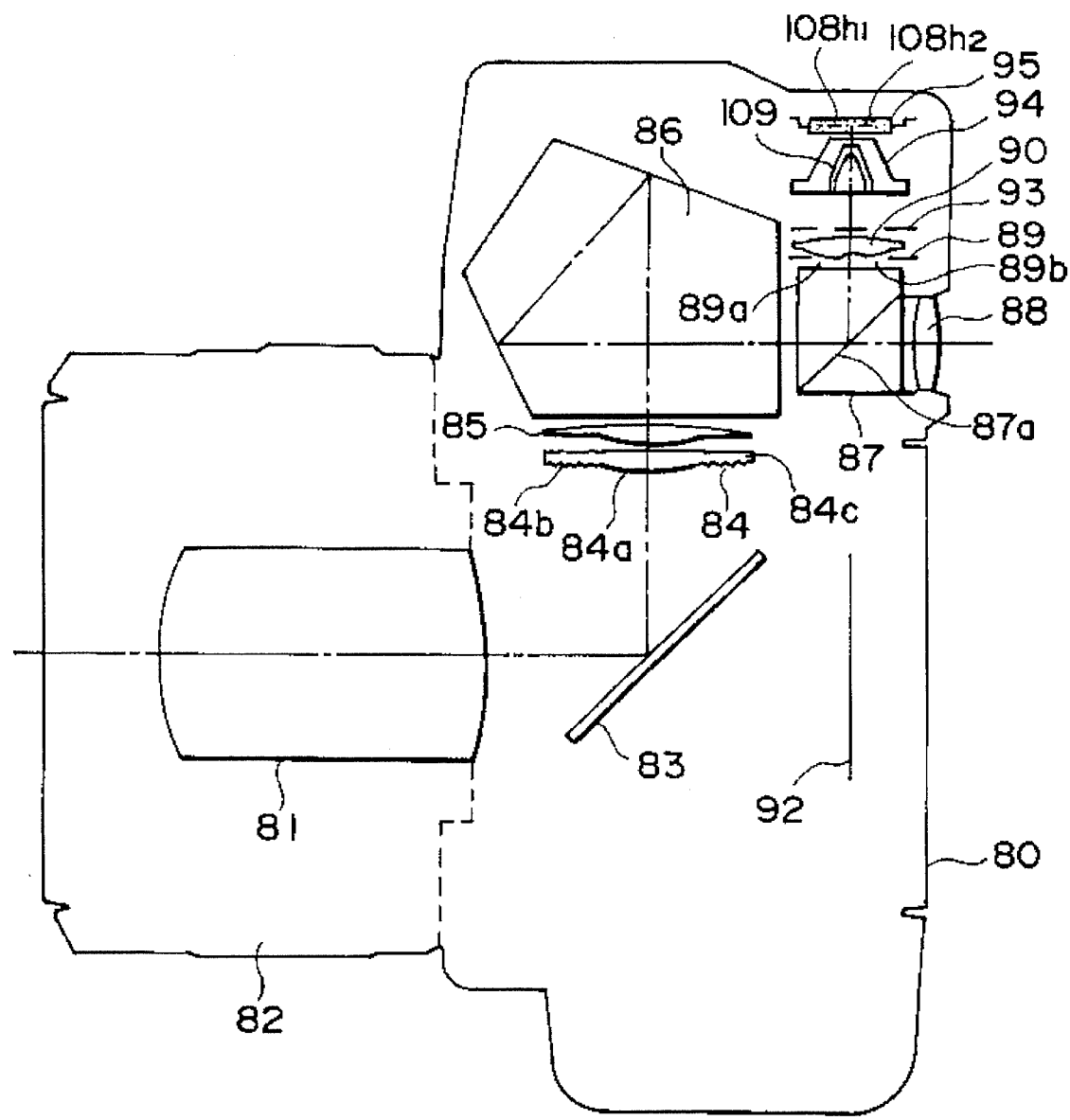
F I G. 1

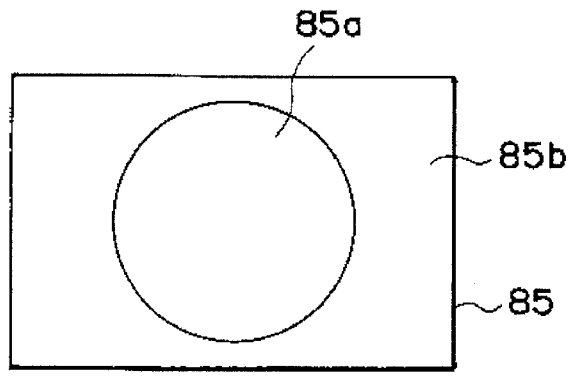
F I G. 4
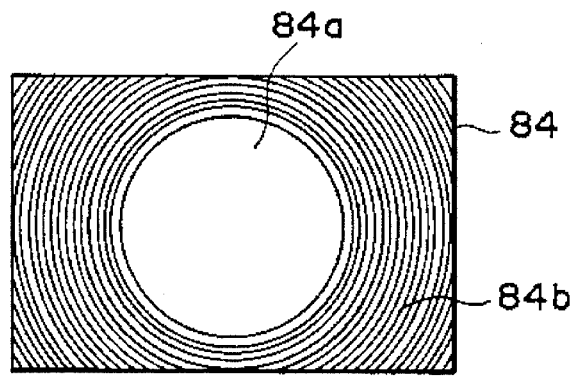
F I G. 5A
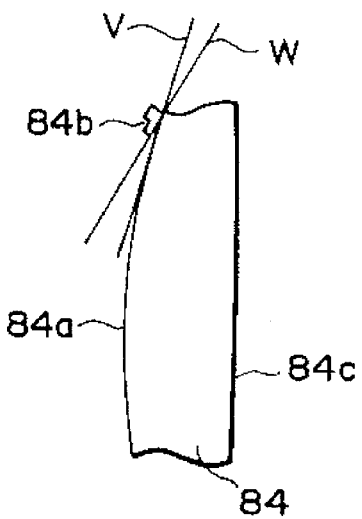
F I G. 5B

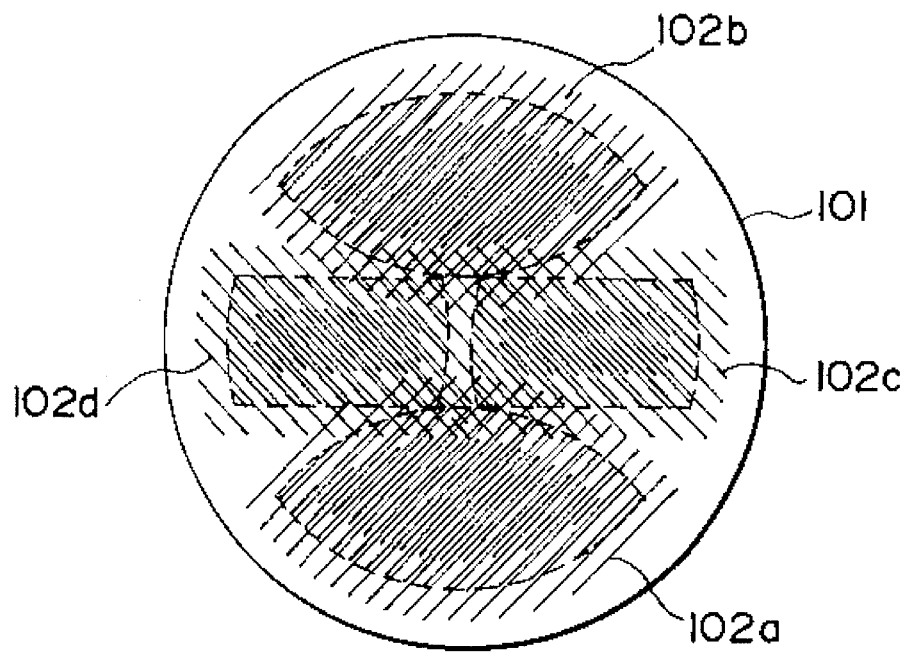
F I G. 10
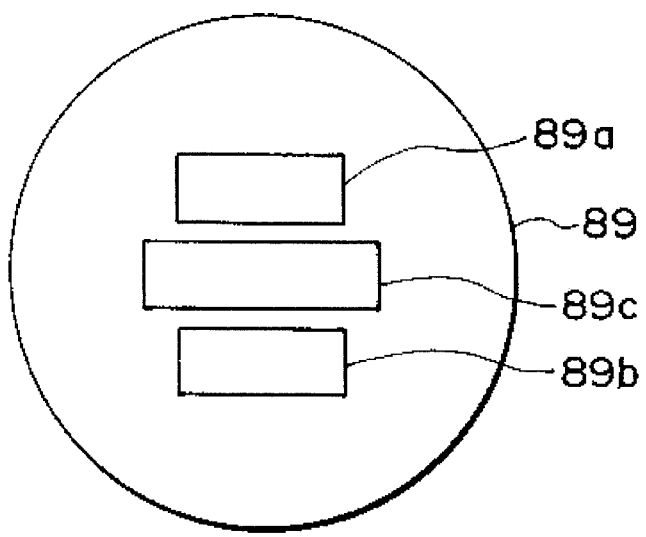
F I G. 11

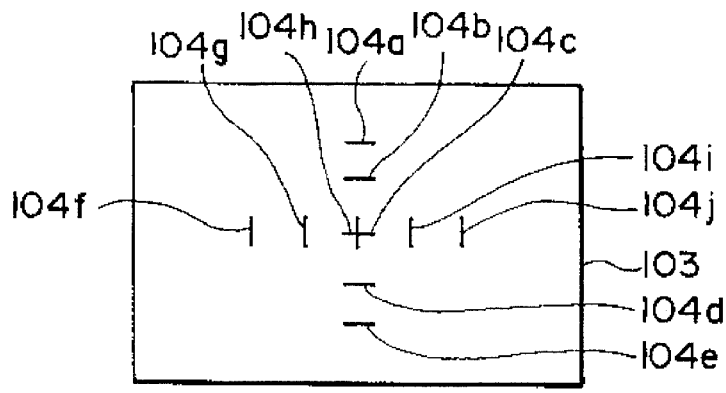
F I G. 12
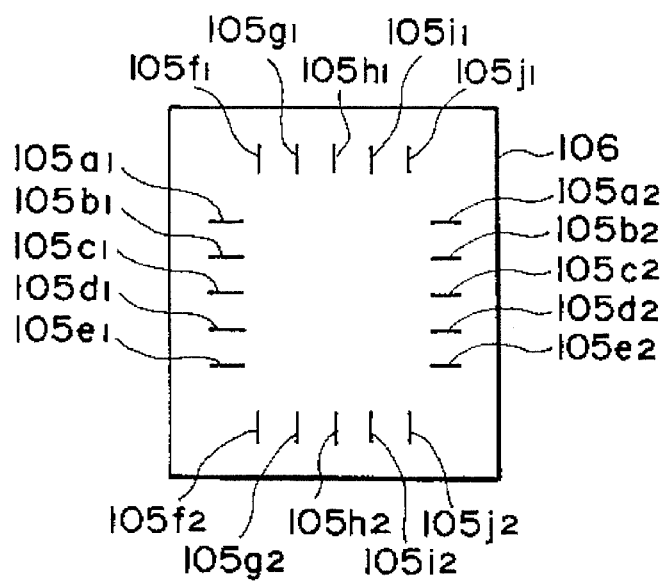
F I G. 13
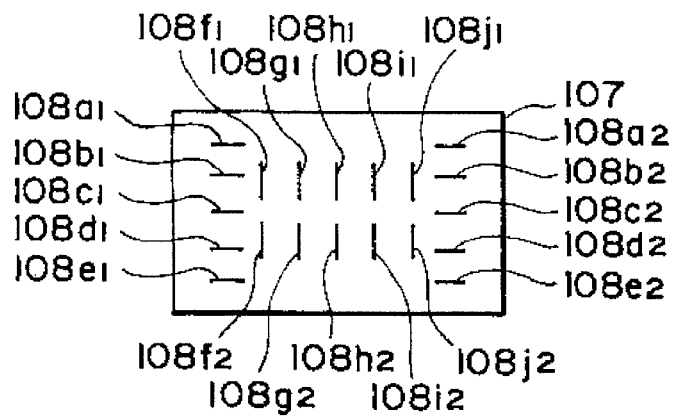
F I G. 14

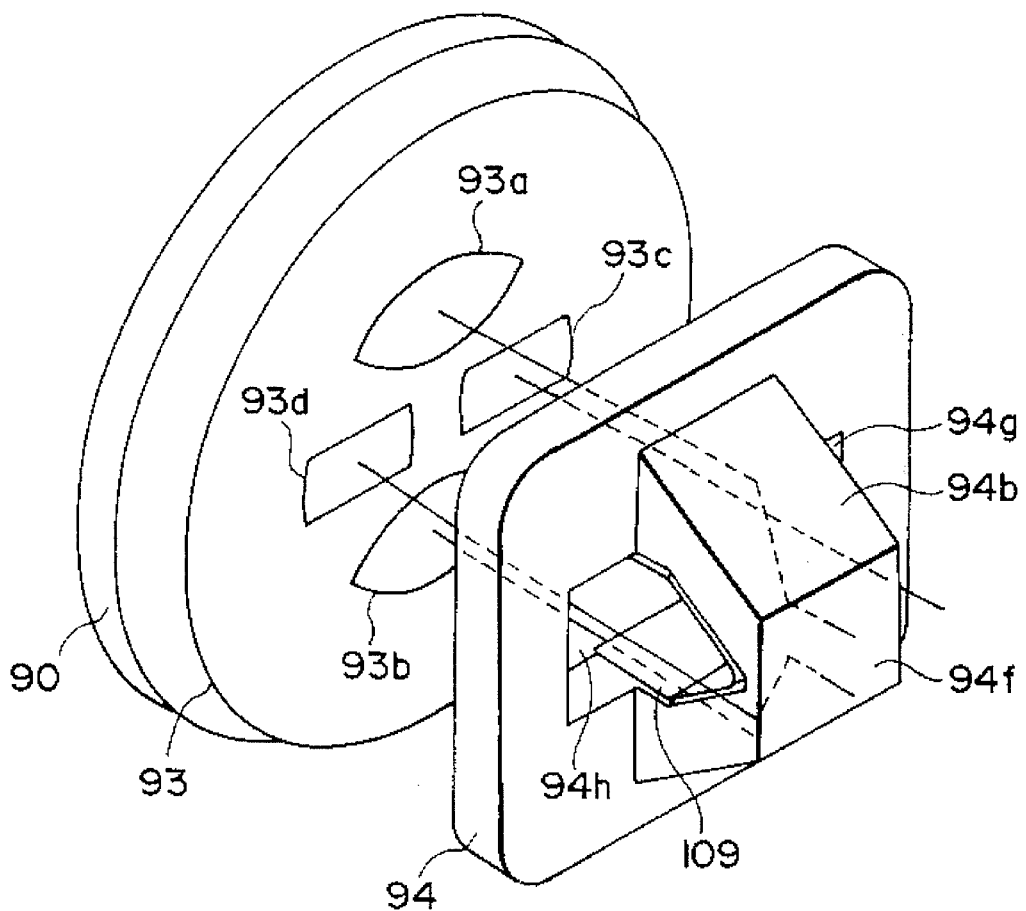
F I G. 16
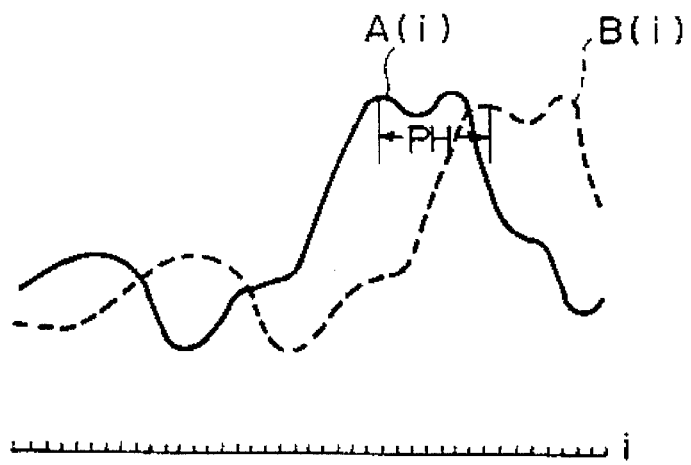
F I G. 18

FOCUS STATE DETECTION APPARATUS

BACKGROUND OF THE INVENTION

1. Field of the Invention

The present invention relates to a focus detection apparatus. More particularly, the invention relates to a focus detection apparatus suitable for a photographic camera, video camera, or the like in which the imaging state of an objective image formed by a photographing lens is detected to perform the focus detection for the photographing lens.

2. Related Background Art

Traditionally, there have been known various focus detection apparatuses for a single lens reflex camera and the like. For example, a method for determining a focusing state by metering several places in a photographing image plane is disclosed in Japanese Patent Laid-Open Application No. 63-13010 and Japanese Patent Laid-Open Application No. 1-120520. The focus direction apparatus of a type represented by these publications is such that a part of a flap mirror which guides the rays of light from an object to the finder system is structured with a semitransparent film to utilize the transmitting light through such a part of the mirror for the focus detection. The system is arranged so that the transmitted light is reflected in the lower direction to the camera body through a sub-mirror provided behind the flap mirror to be received by the detection unit which is arranged at the bottom of the mirror box. A disadvantage of this method is that there is a limitation on the size of the sub-mirror due to the arrangement required so as not to cause the imaging light beam to be eclipsed at the time of photographing. Particularly, it is difficult for the system to arrange metering fields in the upper and lower regions of the image plane to be photographed.

A focus detection apparatus disclosed in Japanese Patent Laid-Open Application No. 2-24616 is designed to eliminiate the limitation described above. In such an apparatus, the limitation caused by the sub-mirror is eliminated by a partially shared use of the finder optical system and focus detection optical system for a single lens reflex camera. As a result, it possible to arrange a layout of the metering field in a wide area of the photographing image plane.

Also, in Japanese Patent Laid-Open Application No. 64-44906, a detailed description is made of the relationship between the focus detection light beam and the effective F number, F No., which is a common restraint on the phase difference detection method adopted as the focus detection method disclosed in the aforesaid publication. In this application, there is a disclosure of a technique which causes the computation of a focus detection to be disabled if the focus detection beam is eclipsed.

As has been described, in a single lens reflex camera and like apparatuses, a focus detection method, which is free from any restraint on the photographing image plane, is in demand. However, there are several restrictive items which should be cleared before implementing such a detection method practically.

A first item is that the quality of the optical image, which is formed actually on a photoelectric conversion element for performing the phase difference detection, should be a desirable one. When a detection is actually performed by an image sensor or the like, the fine pattern of an object cannot be resolved on the photoelectric conversion element in some cases if its dotted image is not evenly formed depending on the position on the image plane. Now, as these fine patterns have the most information regarding the required focus adjustment, the inferior resolution causes the degradation of the accurate performance of the focus detection. Also, the degree of correlation between the two images detected as a pair is lowered. As a result, the accuracy of the focus detection is degraded.

A second item is the problem of cost as a matter of course.

If the aforesaid conventional examples are reviewed from the lost viewpoint the structure disclosed in the Japanese Patent Laid-Open Application No. 2-24616, for example, uses only one piece of biconvex lens for the reimaging optical system, which is simply positioned behind its iris. Therefore, although there is a disclosure of a structure in which the light having a high angle of view can be drawn while avoiding the restraint on the width of light beam due to the sub-mirror, its imaging performance in the circumference of the image plane is not desirable. This is against the first restrictive items mentioned above.

In order to improve the imaging performance, it may be one of the solutions to adopt a lens structure such as a triplet for the reimaging optical system, but this results in a significant problem of a higher cost, and is against the aforesaid second item. This is far from being realistic.

Also, in the aforesaid Japanese Patent Laid-Open Application No. 63-1310 and Japanese Patent Laid-Open Application No. 1-120520, a technique is disclosed to divide a condenser lens into a plurality of areas to optimize it for each of the metering fields. However, in the objective method by the application hereof, the use of the condenser lens is shared with the finder optical system, and the disclosed technique can hardly be adopted. Eventually, therefore, it is difficult to provide the metering field in the wide area of the photographing image plane.

With the structure of the optical system in view, the common use of an optical path for both a focus detection system and finder optical system presents another problem in improving the imaging performance referred to in the aforesaid first item. Such a problem is due to a pentagonal prism which is incorporated in the finder system. The common use of the pentagonal prism necessitates making the optical path long for the optical system which causes the photoelectric conversion element to perform reimaging for the focus detection. As compared with the conventional type such as storing a detection system at the bottom of a mirror box, the optical path is several times longer. Supposing that the length of pixel array of a photoelectric conversion element to be used is defined the same as the conventional one, it is necessary to make the imaging magnification equal for the optical system as a whole even if the length of the optical path becomes longer. Then, an optical system having a desired imaging relationship is obtainable if the reimaging lens is enlarged in analogue by a magnification equal to the portion of the optical path which has become longer than its original length. However, the application of a proportional enlargement such as this results in the enlargement of the aberration values with respect to the length after all. On the other hand, however, the allowable value of aberrations for the system as a whole is invariable. Therefore, such a corrective measure as attempted by a simple enlargement brings about a contradiction. In fact, an aberration such as a spherical aberration, coma aberration, and chromatic aberration is deteriorated more by a given magnification. Particularly, the deterioration of the spherical aberration causes a dotted image to be widened, leading to an inferior resolution of the fine pattern of an object. Accordingly, the fine pattern detection performance is degraded to cause the focus detection capability to be extremely lowered. For the reimaging optical system which needs a longer optical path as aimed at by the present invention, it is necessary to make the dotted images as small as possible as its prime design consideration.

SUMMARY OF THE INVENTION

Therefore, in a focus detection optical system having its finder system and optical path for common use, it is a first object of the present invention to provide a focus detection apparatus provided with a reimaging optical system capable of solving the two conventional problems simultaneously by obtaining evenly dotted images as a whole with the improvement of imaging performance in the circumference of an image plane, and by materializing the provision of small dotted images with the reduction of spherical aberration. Also, it is a second object of the present invention to provide a focus detection apparatus having an iris which is shaped so that the incident light beam to the aforesaid reimaging optical system can hardly be eclipsed by its photographing lens, and that the light beam is utilized effectively.

BRIEF DESCRIPTION OF THE DRAWINGS

FIG. 1 is a cross-sectional view showing a single lens reflex camera in which a focus detection apparatus is incorporated.

FIG. 4 is a plan view showing a condenser lens.

FIG. 5A is a plan view showing a focusing plate.

FIG. 5B is a cross-sectional view showing a focusing plate.

FIG. 10 is a view illustrating an image formed by the iris on the exit pupil of a photographing lens.

FIG. 11 is a plan view showing a light shielding mask.

FIG. 12 is a view showing the positions of a metering field in a photographing image plane.

FIG. 13 is a view showing the pixel arrangement in a metering field in a photoelectric conversion element without using any light guide prism.

FIG. 14 is a view showing the pixel arrangement on the metering field in a photoelectric conversion element according to the present invention.

FIG. 16 is a perspective view showing a part from a light shielding mask to a photoelectric conversion element.

FIG. 18 is a view showing an example of the output from a photoelectric element.

DETAILED DESCRIPTION OF THE PREFERRED EMBODIMENTS

Figure 2:
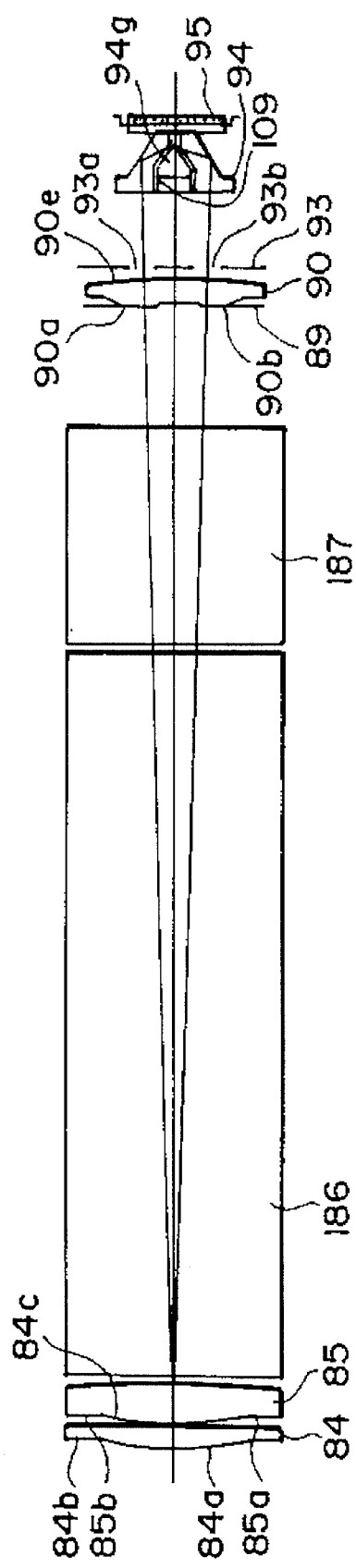
FIG. 2 is a view showing the development of the optical path of a focus detection apparatus according to the present invention.

According to the preferred embodiments of the present invention, there is provided a focus detection apparatus having a reimaging optical system for forming from an objective image produced by a photographing lens a pair of secondary objective images which vary its relative positions in accordance with the imaging state of the objective image thus produced, an iris member provided with a pair of apertures for restricting the light beam passing through the reimaging optical system, and a condenser lens for projecting the apertures of the iris member on the exit pupil of the aforesaid photographing lens, wherein the aforesaid reimaging optical system is arranged between the iris member and the condenser lens and at the same time, the apparatus is structured with an optical member having an optical axis which is different from the aforesaid photographing lens. Also, the pair of the apertures of the iris member are structured with circular arcs at the furthest positions apart from the optical axis of the photographing lens, respectively, and the centers of the circular arcs of the aforesaid pair of apertures are structured so as to allow them to differ from each other in accordance with the difference in the positions from the optical axis of the photographing lens. As a result, although the detailed effects will be described later, it is possible to implement a reimaging optical system capable of obtaining an imaging performance and comparatively small dotted images uniformly up to a higher angle of views as well as enabling the incident light beam received by this system to be effectively utilized without being eclipsed by the photographing lens.

FIG. 1 is a schematic view showing a principle part of a first embodiment according to the present invention. FIG. 1 is a cross-sectional view illustrating a single lens reflex camera in which a focus detection apparatus according to the present invention is incorporated. In FIG. 1, a reference numeral 80 designates the main body of the single lens reflex camera; 82, a lens barrel for holding a photographing lens 81 movably in the direction of the optical axis; and 83, a movable mirror. The movable mirror 83 is in a state where it is flipped down when an object is observed, and serves to guide the light beam from the photographing lens 81 to a finder and a focus detection system of the present invention by deviating the light beam upward. Also, the movable mirror 83 is flipped up to a position where it can never eclipse the light beam from the photographing lens immediately before starting the exposure of a photographing film 92 at the time of photographing, and is again returned to the state shown in FIG. 1 as soon as the exposure is terminated.

Then, regarding the finder and focus detection system, a reference numeral 84 designates a focusing plate on which the objective image is projected by the photographing lens 81, and which, at the same time, serves to diffuse the metering light beam; 85, a condenser lens; 86, a pentagonal prism; 87, a beam splitter; and 88, an ocular. On the incidence plane of the focusing plate 84, a spherical portion 84a is formed for allowing the metering light beam to enter a matt plane 84c formed on the exit plane of the focusing plate 84 at an angle substantially vertical thereto and on the circumferential portion which is outside the metering field, a Fresnel lens is formed. A portion of the matt plane 84c corresponding to the spherical plane 84a is slightly convexed in order to correct the curvature of an anticipated imaging plane. The rays of light diffused by the matt plane 84c are refracted by the condenser lens 85 arranged behind the matt plane to match the arrangement of the ocular 88.

Subsequently, the rays of light are deflected by the pentagonal prism 86 in the direction toward the ocular 88 to reach the eye of an observer after passing through the ocular 88.

The beam splitter 87 placed immediately before the ocular 88 causes a part of the light getting to the ocular to be reflected upward by a half mirror 87a and serves to effectuate the utilization of the reflected light beam for the focus detection. A light shielding mask 89 and elements thereafter constitute the focus detection system, and a reference numeral 90 designates a secondary imaging lens made of transparent plastic; 93, an iris; 94, a light guide prism; and 108, 108h1 and 108h2, the pixel arrays of the photoelectric conversion elements comprising many pixels, the pixel arrays being held by a transparent plastic package 95. The iris 93 is projected on the exit pupil of the photographing lens 81 by the secondary imaging lens 90, the condenser lens 85, and the spherical plane 84a of the focusing plate 84. Also, the secondary imaging lens 90 serves dually to project the matt plane 84c of the focusing plate onto the photoelectric conversion elements 108h1 and 108h2. The projected image of an object is blurred by the diffusing effect of the matt plane 84c and is in an expanded state.

Figure 3:
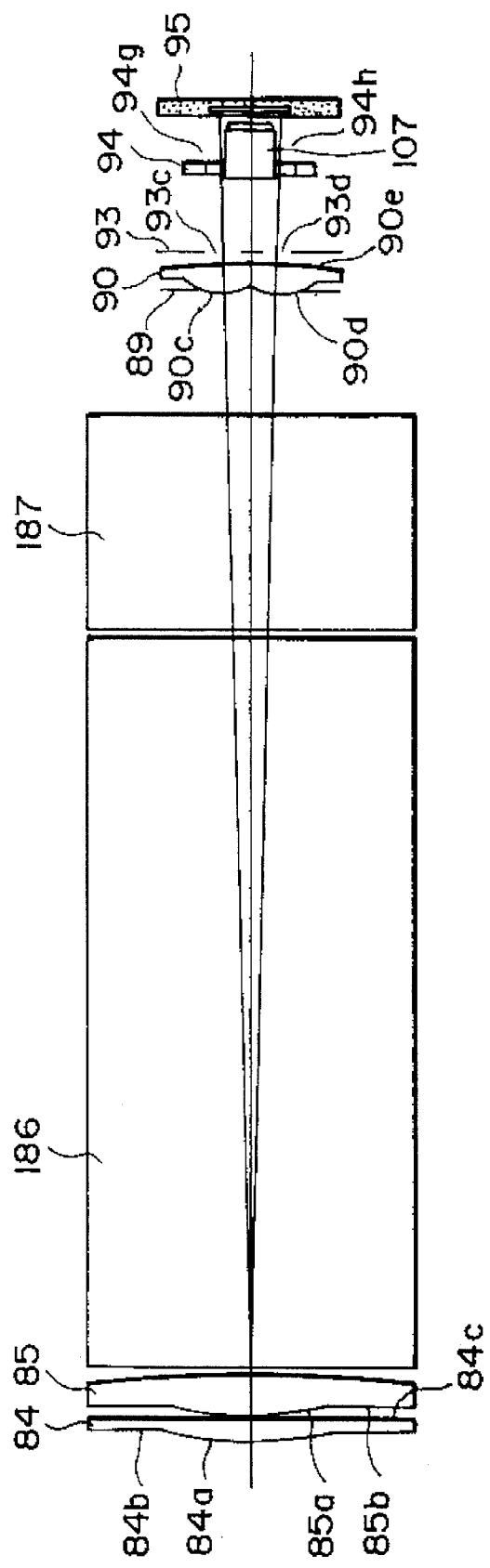
FIG. 3 is a view showing the development of the optical path of a focus detection apparatus according to the present invention.

FIG. 2 and FIG. 3 illustrate the development of the focus detection optical system structured such as this, which is taken along the optical axis. FIG. 2 shows the cross-section of the finder field in the direction of the shorter side. FIG. 3 shows its cross-section in the direction of the longer side. In FIG. 2, reference numerals 186 and 187 designate equivalent parallel flat members having the same lengths of the optical paths as the pentagonal prism 86 and beam splitter 87, which are developed along the optical axis.

The condenser lens 85 has a function to brighten the entire field of the finder by guiding the ocular 88 and the exit pupil of the photographing lens 81 to provide a projecting relationship with each other with respect to the observation system together with a function to obtain a wide metering field by guiding the iris 93 of the focus detection system and the exit pupil of the photographing lens 81 to provide a projecting relationship likewise with respect to the focus detection system. This can be implemented by arranging the ocular 88 and the iris 93 at positions which are substantially equivalent optically.

In providing these two functions with compatibility, it is difficult to give restraint to the curvatures of both planes of the condenser lens 85 because the distortion of the focus detection system affects the detection precision in the projecting relationship of the focus detection system. On the other hand, with respect to the projecting relationship of the observation system, it may be possible to give a restraint to the curvature to a certain extent so as to define it at an arbitrary value forcibly if only a predetermined power can be obtained. The miniaturization of a camera is attempted utilizing this characteristic. Accordingly, a first plane of the condenser lens 85 is structured with a portion having two curvatures.

FIG. 4 is a plan view illustrating this state and the condenser lens 85 is observed in the direction of the incident light. In FIG. 4, a reference numeral 85a designates a spherical plane having a curvature and 85b, a flat plane of the condenser lens. The diameter of the spherical plane 85a is defined to include therein an area where the metering light beam is passed, and the external flat portion is produced as a result of the restriction given to the curvature owing to the observation system. By providing the flat portion in the periphery in this manner, it is possible to make the thickness of the condenser lens 85 extremely thin as compared with the case where a curvature is given to the entire plane of incident light. In this case, the boundary between the spherical plane 85a and the flat portion 85b are discontinuous. In the present embodiment, therefore, the resultant discontinuity of the different refraction powers according to the areas is solved by devising the shape of the focusing plate 84. Now, FIG. 5A is a plan view showing the focusing plate 84 observed in the direction of the incident light. FIG. 5B is a cross-sectional view thereof. As shown in FIG. 5A, the focusing plate 84 is also structured with two areas, that is, a spherical plane 84a and Fresnel lens portion 84b. The boundary portions of the respective two areas formed on the condenser lens 85 and focusing plate 84 are sized to overlapped with each other when a photographer observes the finder through the ocular 88 from the standard position on the optical axis.

FIG. 5B is a cross-sectional view of the focusing plate 84 as described earlier. As is clear from the two tangent lines V and W in FIG. 5B, the Fresnel lens portion 84b is attached to the spherical plane 84a as if an attachment. Because of this, the refraction power of the Fresnel lens 84b is greater than the spherical plane 84a. As a result, this compensates the lowered refraction power with respect to the spherical plane 85a of the flat portion 85b of the condenser lens 85 with which this portion has the corresponding relationship. In other words, in order to satisfy the aforesaid projecting relationship over the entire field with respect to the ocular system in the observation system, the overall refraction powers of the spherical plane 84a of the focusing plate 84 and the spherical plane 85a of the condenser lens 85, and Fresnel lens portion 84b of the focusing plate 84 and the flat portion 85b of the condenser lens 85, which are in the corresponding relationship with each other, are matched when considered in terms of the emission plane of the condenser lens 85.

Figure 6A:
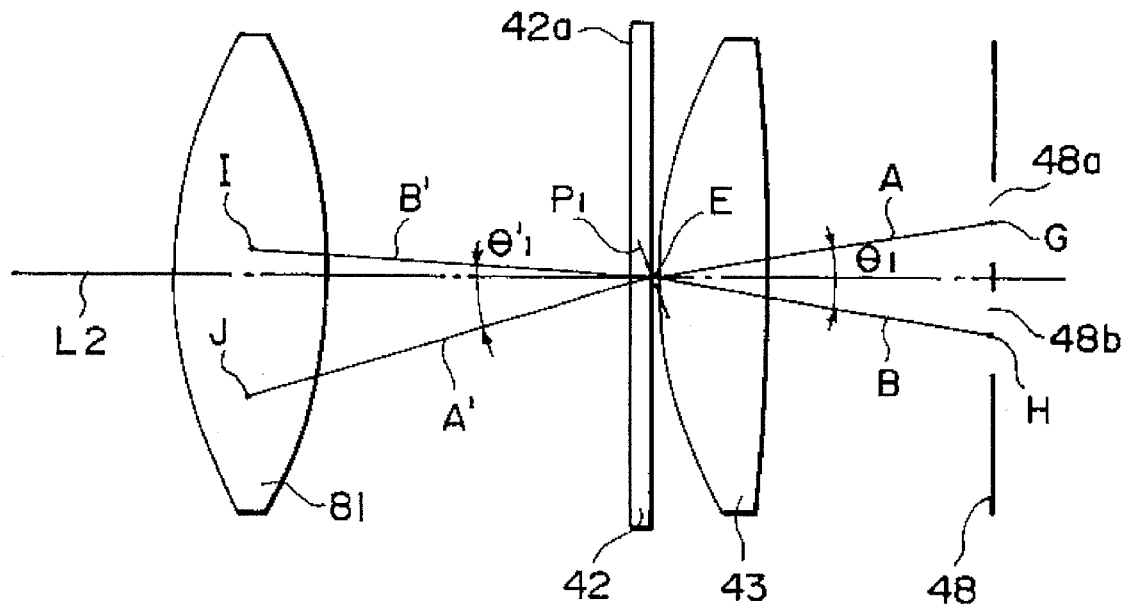
FIGS. 6A and 6B are views illustrating the principle of the focus detection, which schematically show a part from a photographing lens to an iris for illustrating the effect by a focusing plate.
Figure 6B:
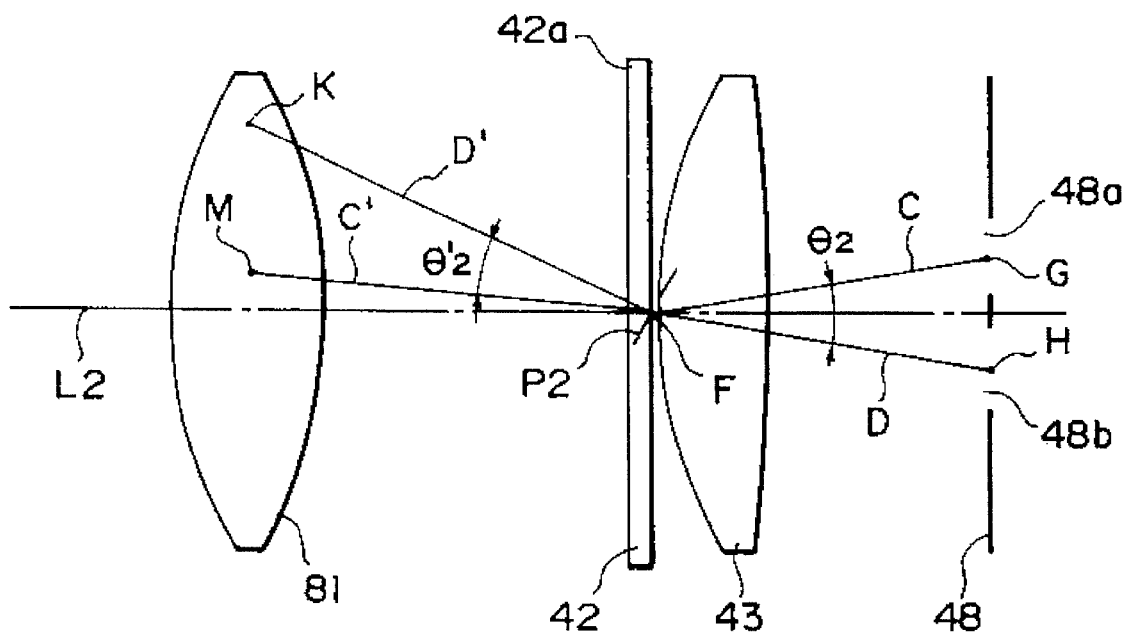

Here, together with the condenser lens 85, the characteristics of the focusing plate 84 will be referred to in the description given below. FIGS. 6A and 6B are views schematically illustrating an optical system from the photographing lens 81 to the iris 93. Here, a part of elements are provided with different reference numerals from those given to the same elements appearing in the drawings hitherto shown. A reference numeral 42 designates a focusing plate; 42a, a matt plane which corresponds to the matt plane 84c hitherto described; 43, a condenser lens against which an iris 48 is placed at a position optically equivalent to the iris 93. The light diffusion resulting from the matt plane 42a needs analysis by wave optics, strictly speaking, but it can be described approximately according to geometrical optics.

Now, in FIG. 6A, there are considered two light beams A and B traveling through points G and H in the aperture 48a and 48b of the iris and point E on the optical axis of the matt plane 42. For the sake of simplification, the condenser lens 43 is thin and is considered to be arranged adjacent to the matt plane 42a. Then, the anticipated angle from the point E to the points G and H on the apertures of the iris 48 is θ1. The matt plane 42a is an aggregate of a fine continuous irregularities because it is a diffusion plane. Now, assuming that the contacting plane of the matt plane 42a at the point E is a plane indicated at P1 in FIG. 6A, the light beams A and B are refracted here and become its refracted light beams A' and B'. The points which the two refracted light beams reach on the exit pupil of the photographing lens 81 are designated as I and J, respectively.

Likewise, in FIG. 6B, a point F is defined in the vicinity of the furthest place from the point E on the optical axis of the matt plane 42a, and the behavior of the light beam at that point is considered. The contacting plane at the point F is designated as P2 as shown in FIG. 6B, and the anticipated angle from the point F to the points G and H on the apertures of the iris is assumed to be θ2. Also, in the case of FIG. 6A, two light beams C and D traveling through the points G and H on the apertures of the iris 48 and the point F are refracted at this point to become the refracted light beams C' and D'. The points which the two refracted light beams reach on the exit pupil of the photographing lens 81 are designated as K and M, respectively.

Now, neglecting the thickness of the focusing plate 42, each of the arrival points I, J, K, and M on the exit pupil of the photographing lens 81 shown in FIGS. 6A and 6B is assumed to have angles θ1' and θ2' anticipated from the points E and F, respectively. The point E and point F are separated by an extremely short distance. Therefore, if θ1 and θ2 and the inclination of the contacting plane are assumed to be settled within a small range, the following relationship will be established approximately:

$$\theta1' \cong \theta2'$$

Figure 7:
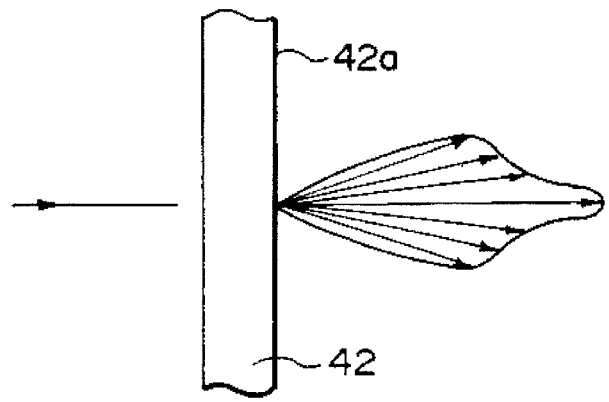
FIG. 7 is a view showing an example of the diffusion characteristics of the focusing plate.

This means that the anticipated angle from a point at which the optical axis intersects with the matt plane 42a to the two apertures of the iris is within a small range, and that the length of metering reference lines of the light beams which are refracted within such a range is the same. An example of the diffuse characteristics of the matt plane is shown in FIG. 7 and from the viewpoint of geometrical optics, it can be interpreted that there exist contacting planes in various directions around the point E and the characteristics are the ones obtainable as a synthesis thereof. The diffuse characteristics of the matt plane are settled within a range with the quantity of light in view, and it is possible to apply the description in FIG. 6 to each of the contacting planes. Also, in FIGS. 6A and 6B, the description is made of a metering with respect to points on the optical axis for simplification, but it is obvious that the same description is applicable to points outside the optical axis. Therefore, the length of the metering reference lines for a focus detection apparatus according to the present invention is determined by the interval between the apertures on the iris 48 and not affected by the characteristics of the diffusion plate.

Figure 8:
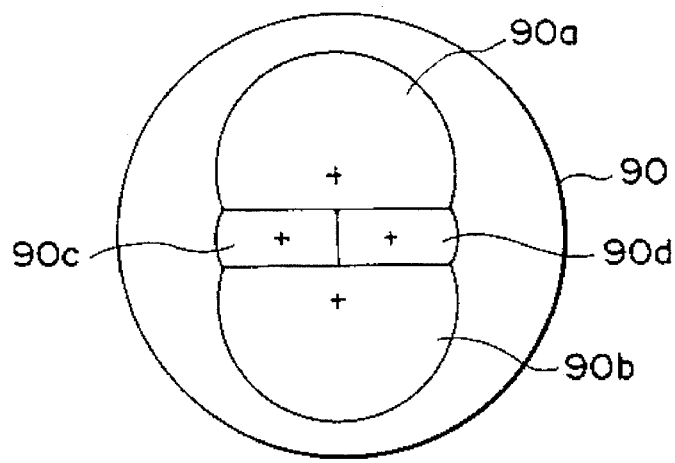
FIG. 8 is a plan view showing a secondary imaging lens.

Now, an additional description will be made of the image formation by the focus detection system again in reference to FIG. 2 and FIG. 3. The secondary imaging lens 90 is a kind of biconvex multi-lens comprising an incident light plane formed integrally with two pairs of lens portions and a light emission plane having a curvature which is co-axial to the optical axis of the photographing lens. FIG. 8 is a view illustrating the shape of the secondary imaging lens 90 observed in the incident light direction, and lens portions 90a and 90b are arranged to sandwich the central lens portions 90c and 90d. In a multi-lens, those lens portions 90a and 90b, and 90c and 90d are paired, respectively, to form the two pairs of objective images which vary the relative positions in response to the imaging state of the photographing lens 81. These multi-lenses are all structured with spherical planes, and the center of the sphere is set so that the respective rays of light traveling through the centers of gravity of the four apertures on the iris 93 from the positions on the optical axis of the matt plane 84c of the focusing plate 84 can enter each of the multi-lenses corresponding to the aforesaid aperture almost vertically.

The light emission plane 90e of the secondary imaging lens 90 is a spherical plane common to the aforesaid multi-lenses 90a to 90d, and the optical axis thereof is common to the photographing lens 81. The center of sphere of the light emission plane 90e is set at a position optically equivalent to the vicinity of the matt plane 84c of the focusing plate 84 which is the objective plane to the secondary imaging lens 90. In other words, when the length of the optical path of the pentagonal prism 86 and beam splitter 87 are converted in terms of air, the center of the matt plane 84c is substantially matched with the center of the sphere of the light emission plane 90e of the secondary imaging lens. As described earlier, the secondary imaging lens 90 provides a position on the optical axis of the matt plane 84c of the focusing plate 84 on the incident light side, and the four light beams which pass through the centers of gravity of the respective apertures of the iris 93 enter the multi-lenses 90a to 90d on the incident light side vertically. Therefore, the aforesaid four light beams are emitted from the emission plane 90e almost vertically. The optical system thus structured is a significant characteristic of the present invention.

The secondary imaging lens 90 is thus structured so that the light beam which is emitted from the center of the focusing plate 84c and passed through the centers of gravity of the respective apertures of the iris 93, that is, the light beam which becomes the center of gravity of the luminous flux passing through each of the multi-lenses 90a to 90d, is guided to the photoelectric conversion element 108 without any curve. This fact means that the variation of the interval between the two images which make a pair can be made extremely small even when the frequency of the light from a substance changes variously depending on objects. Therefore, there are almost no detection errors with respect to the colors of a substance due to the effects of the chromatic aberration of the focus detention system, which has traditionally been a problem.

When a structure of an optical system according to the present invention is adopted, it is desirable to define the imaging magnification by the secondary imaging lens 90 to be −0.2 to −0.5 times approximately in order to make the metering field large while keeping the chip area small for the photoelectric conversion element 108. The optical system shown in FIG. 2 and FIG. 3 represents an example of approximately −0.2 times. In general, when a reduction imaging system such as this is structured with a single convex lens, it is known that from the principle of aberration sharing, the curvature of the plane of incident light is intensified while the curvature of the plane on the light emission side is weakened to make the aberration small for the reduction of the dotted image to be projected. As shown in FIG. 2 and FIG. 3, the plane of the incident light 90e of the secondary imaging lens 90 is common with respect to the multi-lens on the incident side, yet it cannot but have a weak curvature due to the restriction that the center of its sphere is optically in the vicinity of the matt plane 84c. On the other hand, the multi-lens of a small diameter on the incident side has an intensified curvature in order to maintain the imaging magnification while compensating the weak curvature on the light emission side. From this point of view, the embodiment shown in FIG. 2 and FIG. 3 conform to the principle of aberration sharing, making it possible to implement small dotted images. To implement the small dotted images on the focus detection system means that was described earlier, the metering can be performed to finer patterns, which significantly contributes to improving the detection performance.

In order to satisfy the metering accuracy of a camera, it is necessary to adjust the position of luminous energy distributions regarding the two pairs of objects which have been formed and the position of the pixel array of the photoelectric conversion elements which receive them with a precision several μm or less. The greatest problem in manufacturing the system using the secondary imaging lens formed integrally with two pairs of lens portions according to the present invention and the photoelectric conversion element having the corresponding pixel array on one chip is primarily of the positioning of the optical axis within the secondary imaging lens itself. In a secondary imaging lens according to the present embodiment, the above problem is solved by structuring its plane of incident light with one spherical plane which is common to the two pairs of multi-lens portions.

The plastic secondary imaging lens is manufactured by an injection molding method or compression molding method. The problem encountered at this juncture is that the displacement of the plane of incident light and light emission plane of each of the secondary imaging lenses and the displacement between the respective secondary imaging lenses themselves. Particularly, when two pairs of seondary imaging lenses are used as in the case of the present invention, it is extremely difficult to achieve the accuracy between lenses with each other if the aforesaid secondary imaging lenses are irregular and its four optical axes exist both in the incident and emission portions of a metal mold. Especially, the precision of the portion becoming a reciprocally rotative component in the portions constituting the plane of incident light and light emission plane of the metal mold must be severe, and if there is any error therein, the image of the respective secondary imaging lenses is complicatedly deformed by aberration depending on the amount of such error. As a result, the dotted images of the secondary imaging lenses themselves which produce the images to be paired are not analogous to each other any longer.

The actual detection of a focusing state is performed by causing the image of a substance which is an object to be formed as a pair on each of the photoelectric conversion elements on a system through the photographing lens 81 to the secondary imaging lens 90. Here, if, for example, the photographing lens 81 is extended in the left-hand side in FIG. 2 and FIG. 3 to be in the so-called front focus state, the pair of the images of a substance which are formed on the light receiving planes of the photoelectric conversion element are displaced in the direction to approach each other. By the output variation of the photoelectric conversion element in response to the relative displacement of the images themselves, the front focus state and its amount are detected. If the photographing lens is in a rear focus state, the images which form a pair are displaced in the direction opposite to the case of the front focus state, thus detecting the rear focus state and its amount.

In this way, the detection of the focus state is performed on the basis of the interval between the images which form a pair. Therefore, the disagreement of the images themselves, which should form a pair, results in a metering error as it is. If the light emission planes have a common spherical plane as in the case of the present embodiment, there is no effect of the reciprocal rotation at all, making easier manufacturing possible.

The light beam having passed the secondary imaging lens enters the iris 93 which is arranged behind it. The iris 93 is arranged slightly apart from the secondary imaging lens 90 as shown in FIG. 2 and FIG. 3, and has two pairs of apertures facing the multi-lens constituting the secondary imaging lens 90.

Figure 9:
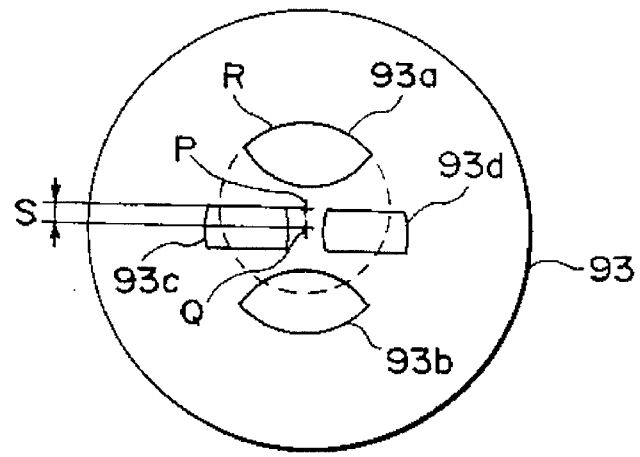
FIG. 9 is a plan view showing an iris.

FIG. 9 is a plan view showing the iris 93 in which the shapes of the apertures are represented. With respect to the secondary imaging lenses 90a to 90d, the apertures 93a and 93b, and 93c and 93d are paired, respectively, the distance between the centers of gravity of apertures themselves are equivalent to the length of the metering reference lines. As is clear from FIG. 9, the length of the metering reference line determined by the apertures 93a and 93b is defined to be longer than the length of the metering reference line determined by the apertures 93c and 93d. This is the feature which is utilized for minimizing the chip area of the photoelectric conversion element thus making the entire system compact.

All the four apertures 93a to 93d are of the shape surrounded by two circular arcs. The shape of the outer circular arc is defined so as to form an image as a circle around the optical axis of the photographing lens 81 when the circular arc is projected on the exit pupil of the photographing lens 81 through the spherical plane 84a of the focusing plate 84, condenser lens 85, and the secondary imaging lens 90. The inner circular arc is fixed by moving the outer circular arc of the other aperture which forms a pair therewith in parallel in the other direction. Thus, the shapes of the paired apertures become identical to each other. Accordingly, the shapes of the effective diameters of the paired secondary imaging lens system on the photographing lens 81 are matched as described later, and the analogous luminous energy distributions are not lost even if the objective image is defocused.

In this respect, the shape of the outer circular arc of the iris 93 must be given particular attention. Because the structure of the secondary imaging lens 90 is of a system eccentric to the photographing lens 81, the center of the outer circular arc of the iris 93 differs from the point Q at which the optical axis of the photographing lens 81 intersect the iris 93. As shown in FIG. 9, the center of the outer circular arc R of the aperture 93a is at P, and it is eccentric from the point Q at which to intersect the optical axis of the photographing lens by a length S. Here, when the outer circular arc is projected onto the exit pupil of the photographing lens 81 through the spherical plane portion 90a of the secondary imaging lens 90, the image becomes eccentric to be a circular arc around the optical axis of the photographing lens 81. It is therefore possible to draw the light beam most effectively. FIG. 10 is a view illustrating a projected image of the iris apertures, in which a reference numeral 101 designates the exit pupil of the photographing lens 81; 102a to 102d, each of the projected images of the iris apertures 93a to 93d. The distance between the iris apertures which form a pair with each other corresponds to the length of the metering reference line. Now, because the matt plane 84c of the focusing plate 84 is provided in the optical path, the images of the iris 93 are blurred to have expansions in accordance with the diffuse characteristics as shown in FIG. 7. The hatched portions in FIG. 10 represent such blurred expansions. In this respect, the iris 93 is positioned behind the secondary imaging lens 90 for enhancing the uniformity of the dotted images with respect to the angle of view.

FIG. 11 is a view showing the shape of a shielding mask 89 positioned immediately before the secondary imaging lens 90. The shielding mask 89 has three apertures 89a to 89c. The other parts are all light shielding portions. With this shielding effect, a ghost is prevented beforehand from being generated by the difference in level at the junction of the four multi-lenses 90a to 90d of the secondary imaging lens 90.

It has been already described that the focus detection system according to the present invention has a long total length due to the intervention of a pentagonal prism 86. On the other hand, in order to improve the metering precision, the interval between the centers of gravity of the iris apertures 93 must be wide. As a result, the paired luminous energy distributions of a substance are formed at positions considerably apart from each other. FIG. 12 shows the relationship between the metering fields and the photographing image plane 103. As shown in FIG. 12, when the metering fields 104a to 104j are arranged in a cross shape for a photographing image plane 103, it is necessary to prepare a pixel arrangement as shown in FIG. 13 for a simple projection of such a cross shape arrangement by the secondary imaging lens 90. In FIG. 13, a reference numeral 106 designates a photoelectric conversion element, and 105a1 to 105j2, its pixel array. The subscript reference marks a to j given to the pixel array are identical to the subscript reference marks given to the metering fields 104. Also, the subscript numerals 1 and 2 discriminate from the same metering fields a correspondence of the two images which are formed as a pair when passing through the secondary imaging lens 90. When a simple projection is perfored, a wide dead space is generated without any pixel array in the central portion of the photoelectric conversion element 106 as shown in FIG. 13. Generally, the production yield of a semiconductor device such as a CCD is rapidly lowered as its chip size becomes larger. Consequently, a large photoelectric conversion element such as this is extremely expensive.

Figure 15:
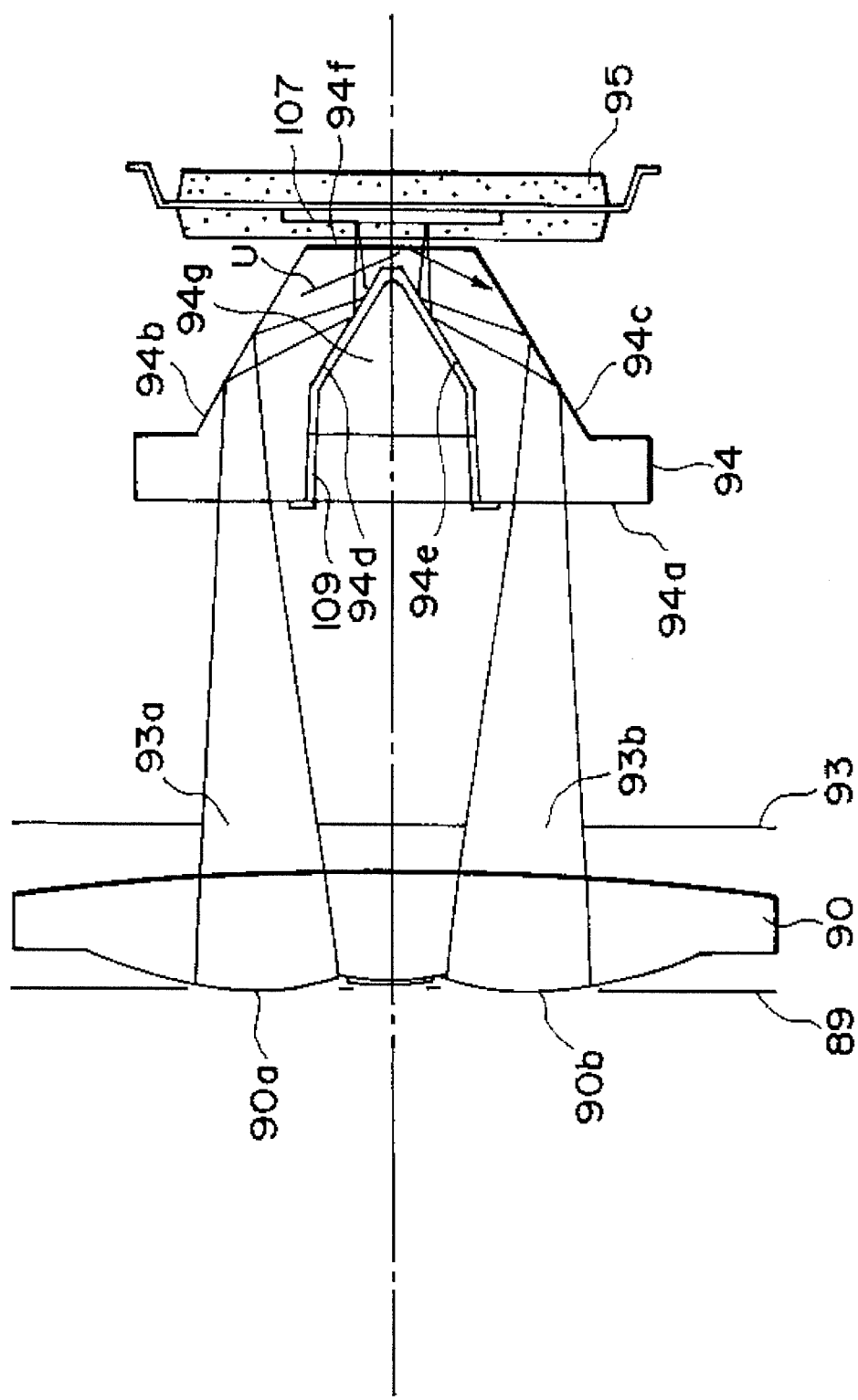
FIG. 15 is a perspective view showing a part from a light shielding mask to a photoelectric conversion element.

The embodiment shown in FIG. 2 and FIG. 3 is structured to make the chip size of the photoelectric conversion element small using the light conductive prism 94 in consideration of the above-mentioned problem. FIG. 15 and FIG. 16 are a partially enlarged view, respectively, of and perspective view of the light conductive prism 94 and its vicinity. FIG. 15 is a cross-sectional view corresponding to the system shown in FIG. 2A, and in this cross-section, the transparent plastic light conductive prism 94 has six optical planes 94a to 94f. These six planes have a function to hold in the optical path to the optical axis of the photographing lens 81 and a function to cut off unwanted light simultaneously.

In FIG. 15, the light beam which has passed the iris apertures 93a and 93b enters the incident plane 94a of the light conductive prism 94. Then, the light beam is emitted from the light emission plane 94f toward the photoelectric conversion element 107 after being reflected twice at the total reflecting planes 94b and 94c, and total reflecting planes 94d and 94e, respectively. On the other hand, as is clear from the reference to FIG. 16, the light beam having passed the iris apertures 93c and 93d passes further through the two apertures 94g and 94h which are opened on the light conductive prism 94 to reach the photoelectric conversion element 107. The optical distance from the secondary imaging lens 90 to the photoelectric conversion element 107 produces a difference depending on whether there is an intervention of the reflection of the light conductive prism 94 or not. However, it is essentially short because the reflecting optical path is in the plastic part, and the difference between them is slight. Also, the curvatures of the two pairs of the multi lenses of the secondary imaging lens 90 can be selected individually for each of them. Therefore, it is possible to implement an optimal imaging with respect to the above-mentioned two kinds of optical paths.

Using the light conductive prism 94 described above, the photoelectric conversion element 107 can be miniaturized efficiently. FIG. 14 illustrates this state. In FIG. 14, a reference numeral 107 designates a photoelectric conversion element. The pixel arrays 108a1 to 108e2 correspond to the metering fields 104a to 104e, and the pixel arrays 108f1 to 108j2 correspond to the metering fields 104f to 104j. The meaning of the subscript reference marks are the same as those described in conjunction with FIG. 13. Here, the pixel arrays 108f1 to 108j1 and 108f2 to 108j2 corresponding to the metering fields 104f to 104j are positioned in a area sandwiched between the pixel arrays 108a1 to 108e1 and 108a2 to 108e2 corresponding to the metering fields 104a to 104e, and there is no wasteful area. The introduction of the light conductive prism 94 enables the efficient miniaturization of the camera main body itself by holding the optical path, not to mention the cost advantage brought about by the reduced size of the photoelectric conversion element itself.

The secondary imaging lens 90 projects the image on the focusing plate 84 onto the four photoelectric conversion elements. It is necessary for the performance of an accurate focus detection to prevent the images from being overlapped on the light receiving portion by shielding the rays of light from the circumference of the metering field. In order to effectuate this, a black shielding coating is given to the planes of the light conductive prism 94 other than the optical planes 94a to 94f thereof. As shown in FIG. 15 and FIG. 16, a shielding plate 109 is provided to cover the total reflecting planes 94d and 94e. This shielding plate 109 enables the separation of the light beam between each of the corresponding pixel arrays of the metering fields 104a to 104e and 104f and 104j.

The two light beams of the metering fields 104f to 104j are drawn by the light conductive prism 94 in the direction of the optical axis by the photographing lens 81. However, the existing difficulty in using a prism is the treatment of unwanted rays of light such as ghost rays. The light arriving at the pixel arrays 108f1 to 108j1 and 108f2 to 108j2 in FIG. 14 are reflected twice before reaching them as described earlier. It is possible to curve only the required light beams toward the pixel arrays by selecting the size of the reflecting plane accordingly. However, part of the rays of light tends to get into the other pixel array which makes a pair passing over the optical axis of the photographing lens 81 without passing the total reflecting plane 94d or 94e. The reason that the light conductive prism 94 is arranged as a plastic part while the total reflection is used for the deviation of the optical path is to solve this problem. For example, the light beam U in FIG. 15 is the light which is emitted from the outside of the metering field of the focusing plate 84, but it is not any of the incident light to the total reflecting plane 94d. If the deviation of an optical path is performed by a simple combination of reflecting mirrors, and not by a prism using the total reflection, the light beam U becomes a ghost light in the pixel array on the opposite side. However, the light conductive prism being structure utilizing the total reflection, the light beam U having a large incident angle of light is totally reflected here due to the effect of the light emission plane 94f, and it is not allowed to reach the photoelectric conversion element 107. Therefore, there is no possibility that any rays of light which do not travel the regulated optical path can enter the pixel array as a ghost light, hence enabling a highly precise focus detection.

Figure 17:
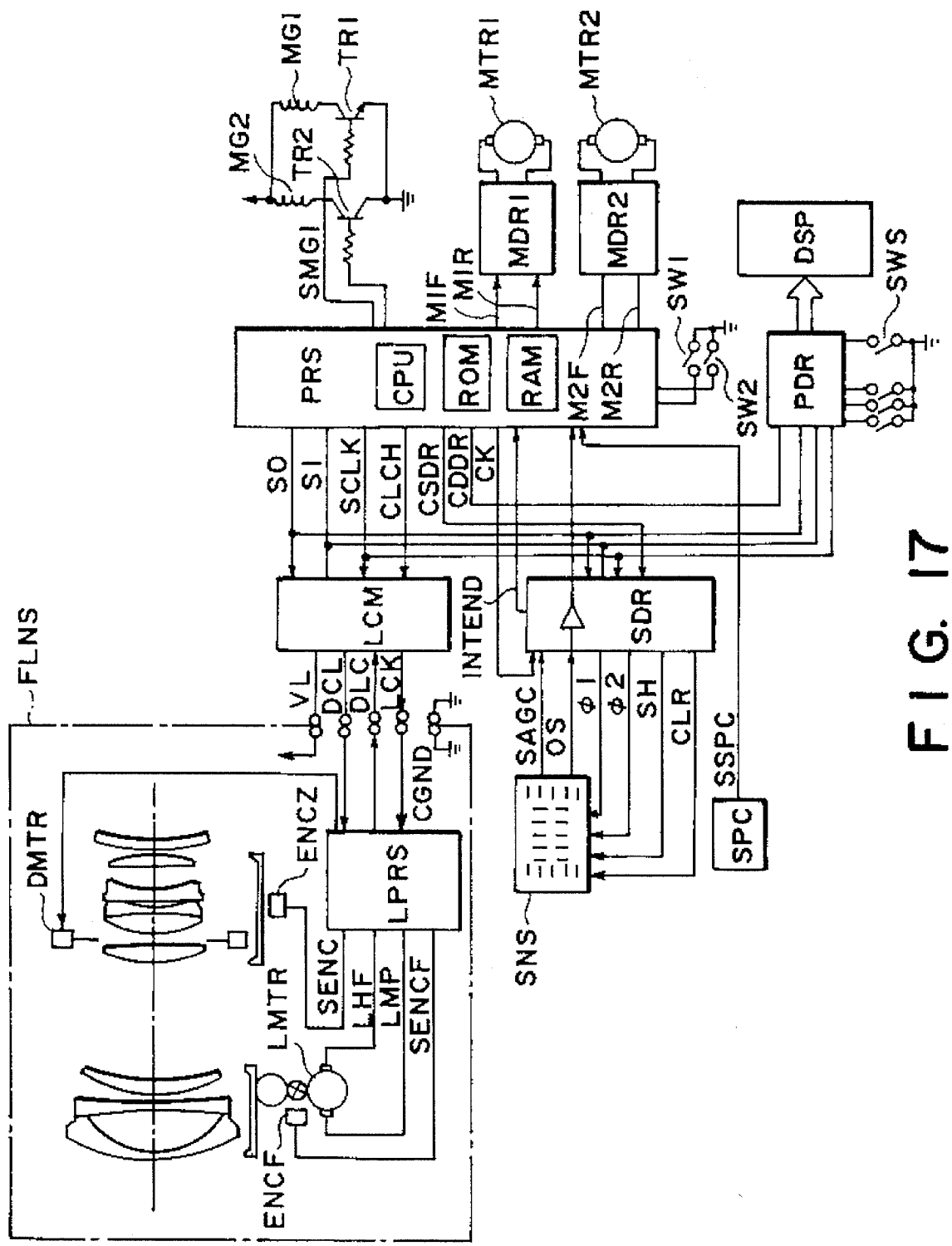
FIG. 17 is a diagram showing an example of the circuit for a camera.

FIG. 17 is a circuit diagram of a single lens reflex camera according to the present invention. In FIG. 17, a reference mark PRS designates a control apparatus for the camera, which is a one chip microcomputer having a CPU (central processing unit), ROM, RAM, A/D converting mechanism, for example. The computer PRS executes a series of routines such as an automatic exposure control function, automatic focus detection function, film winding, and other related functions for a camera operation in accordance with a camera sequential program stored in the ROM. For this execution, the computer PRS uses synchronous communication signals SO, SI, SCLK, and communication selective signals CLCM, CSDR, CDDR to conduct communications with the peripheral circuits incorporated in the camera main body and lenses for the control of the operations of the respective circuits and lenses.

Here, the signal SO is a data signal output form the computer PRS; SI, data signals inputted to the computer; and SCLK, a synchronizing clock for the signals SO and SI.

A reference mark LCM designates a lens communication buffer circuit to supply power to the power terminals of the lenses when the camera is in operation and at the same time, to serve as a buffer for communications between the camera and lenses when the selective signal CLCM from the computer PRS is at a high phase level (hereinafter referred to as "H"). In other words, if the computer PRS makes the CLM at "H" to synchronize it with the SCLK for transmitting given data from the SO, the LCM outputs each of the buffer signals LCK and DCL of the SCLK and SO to the lens through the contacting point between the camera and lens, and the same time, outputs the buffer signal of the signal DLC from the lens as SI while the computer PRS inputs the above-mentioned SI from the lens as data in synchronism with the SCLK.

A reference mark SDR designates a driving circuit of a line sensor device SNS for the use of the focus detection signals, which comprises CCD and others, and is selected when the signal CSDR is at "H" for the computer PRS to control it using SO, SI, and SCLK.

A signal CK is a clock to generate clocks ø1, and ø2 for driving the CCD, and a signal INTEND is the signal which informs the computer PRS of the termination of the stacking operation.

The output signal OS of the sensor device SNS is time series image signals which are synchronous with the clocks ø1 and ø2 and output to the computer PRS as AOS after having been amplified by an amplifying circuit in the driving circuit SDR. The computer PRS receives AOS from its analog input terminal, and stores sequentially at predetermined addresses in the RAM in synchronism with the CK after the A/D conversion performed by the A/D conversion function provided therein.

The output signal SAGC of the sensor device SNS is a sensor output for the use of AGC (Auto Gain Control) in the sensor device SNS, which is inputted in the driving circuit SDR for the use of the accumulation control of the image signals in the sensor device SNS.

A reference mark SPC designates a metering sensor for exposure control which receives light from an object through the photographing lens, and its output SSPC is inputted in the analog terminal of the computer PRS for the use of the automatic exposure control (AE) in accordance with the predetermined program after the A/D conversion.

A reference mark DDR designates a circuit for switching detection and display, which is selected when the signal CDDR is at "H" for the computer PRS to control it using SO, SI and SCLK. In other words, on the basis of data being transmitted from the computer PRS, this circuit performs switching the displays on the displaying member DSP of the camera or informs the computer PRS of the on-off state of each of the operating members of the camera by communications.

Switches SW1 and SW2 are the switches which are interlocked with a release button (not shown) and the switch SW1 is actuated by depressing the release button to a first stage and subsequently, the switch SW2 is actuated by depressing it further to a second stage. The computer PRS is caused to operate the metering and automatic focus adjustment when the switch SW1 is turned on and is triggered to control exposure and wind the film when the switch SW2 is turned on as described later. In this respect, the SW2 is connected to the "interrupt input terminal" of the computer PRS, and even when a program is in operation with the SW1 being turned on, it is possible to shift the operation to a predetermined interrupt program immediately if an interruption is called for by turning on the SW2.

A reference numeral MTR1 designates a motor for feeding a film and MTR2, a motor for operating the mirror up and down and charging a shutter spring. The motors can be controlled by each of the driving circuits MDR1 and MDR2 to drive for normal and reversed rotations. Signals M1F, M1R, M2F, and M2R inputted by the computer PRS to the driving circuits MDR1 and MDR2 are the signals for the motor control.

Reference marks MG1 and MG2 designate magnets for causing the front blade and rear blade of each of the shutters to start traveling, and are energized by signals SMG1 and SMG2 as well as amplifying transistors TR1 and TR2. Then, the shutter control is performed by the computer PRS.

In this respect, the controls of the circuit DDR for switching detection and display, the motor driving circuits MDR1 and MDR2, and the shutter control are not directly concerned with the present invention. Therefore, the detailed descriptions thereof will be omitted.

The signal DCL which is inputted to the inner control circuits LPRS for a lens in synchronism with the LCK is an instruction data from the camera side to the lens FLNS, and the operation of the lens for such instructions is predetermined.

The control circuit LPRS analyzes an instruction to operate the focus adjustment, aperture control in accordance with a predetermined procedure, or to output various kinds of parameters (open aperture F number, focal length, coefficient of defocus amount to feed amount, and the like) for the lens from the output DLC.

In the embodiment, an example of a zoom lens is shown, and when an instruction is issued from the camera for the focus adjustment, the optical system is shifted in the direction of the optical axis by driving the focus adjustment driving motor LMTR with the signals LMF and LMR on the basis of a driving amount and direction which are provided at the same time to effectuate the focus adjustment. The shifting amount of the optical system is being monitored by pulse signals SENCF of an encoder circuit ENCF, and counted by a counter in the LPRS. Then, when a given shifting is completed, the LPRS changes the signals LMF and LMR itself to be "L" for controlling the motor LMTR.

Therefore, once the instruction has been issued from the camera for the focus adjustment, it is then unnecessary for the computer PRS in the camera to participate in driving the lens at all until the lens driving is terminated.

Also, when an instruction is issued from the camera for an aperture control, a stepping motor DMTR which is publicly known as an aperture driving motor to be driven in accordance with the aperture steps provided at the same time. In this respect, the open control is possible for the stepping motor DMTR. Thus no encoder is needed for monitoring its operation.

A reference mark ENCZ designates an encoder circuit attached to a zooming optical system, and the lens inner control circuit LPRS detects a zoom position by inputting signals SENCZ from the encoder circuit ENCZ. In the lens inner control circuit LPRS, the lens parameters for each of the zoom positions are stored, and whenever a request is made from the computer PRS on the camera side, the parameters for the current zoom position are transferred to the camera.

FIG. 18 is a view showing an example of the output of the photoelectric conversion element for the paired two images formed on sensor arrays 91a and 91b. The output of the SAA is given as A(i) while the output of the SAB, B(i). Here, in this example, the pixel number of the sensor is 40 pixels (i–0, . . . , 39).

For a signal processing method for detecting an image deviation amount PR with the image signals A(i) and B(i), there are disclosures in Japanese Patent Laid-Open Application No. 58-142306, Japanese Patent Laid-Open Application No. 59-107313, Japanese Patent Laid-Open Application No. 60-101513, or Japanese Patent Application No. 61-160824, and others, for example.

As described above, according to the present invention, a subject is a focus detection mechanism for detecting the imaging state of an objective image formed by a photographing lens such as adopted for a single lens reflex camera having a reimaging optical system for forming a pair of secondary objective images capable of changing its relative positions with each other in accordance with the imaging state of the objective image, an iris member with a pair of apertures to control the light beam passing through the aforesaid reimaging optical system, and a condenser lens to project the apertures of the aforesaid iris member onto the exit pupil of the aforesaid photographing lens. Also, according to the present invention, the aforesaid reimaging optical system is structured by an optical member having an optical axis different from the optical axis of the aforesaid photographing lens in a space between the aforesaid iris member and condenser lens, and further, the paired two apertures of the aforesaid iris member have circular arc portions respectively at the furthest positions from the optical axis of the aforesaid photographing lens and at the same time, the centers of the aforesaid two circular arcs are arranged to be different from each other. It is also preferable in the present invention to arrange the centers of the aforesaid two circular arcs symmetrically with respect to the optical axis of the aforesaid photographing lens.

According to the present invention, with such an optical arrangement as this, the imaging performance of the aforesaid reimaging optical system is significantly improved particularly in the circumference of its image plane. Thus, it becomes possible to obtain an even dotted images over the entire image plane for which focus detection is conducted. Also, by devising the structure of the multi-lens system of the aforesaid reimaging optical system, it becomes possible to optimize the aberration sharing for the reduction of the spherical aberration to make the size of the dotted image itself small. As a result, the fluctuation of the focus detection performances according to the positions in the image plane becomes small and at the same time, the resolution capability is enhanced following the reduction of the size of the dotted image, hence achieving the provision of a focus detection apparatus for which its focus detection capability itself has been improved.

The structure of the optical system according to the present invention is extremely simple, so that the cost problem has also been solved. The iris is also shaped so that the incident light beam to the aforesaid reimaging optical system is effectively utilized without being eclipsed by the photographing lens. Accordingly, there is a feature that the focus detection apparatus can be operated in a better condition.

What is claimed is:

1. A detection apparatus for detecting a state of focus adjustment of an objective lens, comprising:

optical means for forming luminous intensity distributions capable of changing relative positions therebetween in accordance with the focus adjustment state of said objective lens from a light beam which passes through said objective lens;

light regulation means, having at least one pair of apertures, for regulating light passed through said optical means, an outside portion of each of said pairs of apertures being shaped in non-concentric circular arcs, a center of each of said non-concentric circular arcs being arranged to be different from an optical axis of said objective lens; and light receiving means for detecting a state of said luminous intensity distributions to form signals corresponding to the state of focus adjustment of said objective lens.

2. A detection apparatus according to claim 1, wherein said optical means comprises a multi-lens with the lens plane on the incident side of the light beam from the objective lens having a stronger refraction power than the lens plane on the light emission side.

3. A detection apparatus according to claim 2, wherein a mask member is positioned on the light incident plane of said optical means.

4. A detection apparatus according to claim 1, further comprising light conductive means positioned between said light regulation means and said light receiving means for guiding the light to the light receiving plane of said light receiving means.

5. A detection apparatus according to claim 1 further comprising means for making a light flux incident on said optical means diffuse.

6. A detection apparatus according to claim 1 wherein said optical means comprises a pair of secondary image formation lenses for forming a plurality of metering fields.

7. A focus detection apparatus, comprising:

reimaging optical means for forming a pair of secondary objective images capable of changing relative positions with each other in accordance with an imaging state of said objective images in order to detect an imaging state of an objective image formed by a photo-taking lens;

an iris member having a pair of apertures for controlling a light beam passing through said reimaging optical means;

means for making a light flux incident on said reimaging optical means diffuse; and a condenser lens for projecting the apertures of said iris member onto an exit pupil of said photo-taking lens, wherein said reimaging optical means is structured by an optical member having a pair of optical axes different from the optical axis of said photo-taking lens in a space between said iris member and said condenser lens, and the two apertures which are paired on said iris member have circular arc portions respectively at substantially the furthest positions from the optical axis of said photo-taking lens, and centers of said two circular arcs are arranged to be different from each other.

8. A focus detection apparatus according to claim 7, wherein the centers of said two circular arcs are arranged symmetrically with respect to the optical axis of said photo-taking lens.

9. A detection apparatus according to claim 7 wherein said reimaging optical means comprises a pair of secondary image formation lenses for forming a plurality of metering fields.

10. A detection apparatus for detecting a state of focus adjustment of an objective lens, said apparatus comprising:

optical means for forming luminance intensity distributions capable of changing relative positions therebetween in accordance with the focus adjustment state of said objective lens from a light beam which passes through said objective lens, said optical means comprising a multi-lens unit with the lens plane on the incident side of the light beam from the objective lens having a stronger refraction power than the lens plane on the light emission side;

light regulation means disposed after said optical means to regulate a light beam which passes through said optical means; and light receiving means for detecting a state of said luminance intensity distributions to form signals corresponding to a state of focus adjustment of said objective lens.

11. An apparatus according to claim 10, wherein said light regulation means includes at least one pair of apertures for regulating light passed through said optical means, an outside portion of each pair of apertures being shaped in non-concentric circular arcs, a center of each of said non-concentric circular arcs being arranged to be spaced from an optical axis of said objective lens.

12. An apparatus according to claim 10, further comprising means for making a light flux incident on said optical means diffuse.

13. A detection apparatus for detecting a state of focus adjustment of an objective lens, said apparatus comprising:

optical means for forming luminance intensity distributions capable of changing relative positions therebetween in accordance with the focus adjustment state of said objective lens from a light beam which passes through said objective lens;

light regulation means disposed after said optical means to regulate a light beam which passes through said optical means;

light receiving means for detecting a state of said luminance intensity distributions to form signals corresponding to a state of focus adjustment of said objective lens; and light conductive means positioned between said light regulation means and said light receiving means for guiding the light to the light receiving plane of said light receiving means.

\* \* \* \* \*

UNITED STATES PATENT AND TRADEMARK OFFICE
CERTIFICATE OF CORRECTION

PATENT NO. : 5,543,886
DATED : August 6, 1996
INVENTOR(S) : YASUO SUDA

It is certified that error appears in the above-indentified patent and that said Letters Patent is hereby corrected as shown below:

On the title page:

At [63]

Insert: --Related U.S. Application Data
[63] Continuation of Ser. No. 309,466, Sept. 22, 1994, abandoned, which is a continuation of Ser. No. 229,124, April 18, 1994, abandoned, which is a continuation of Ser. No. 875,838, April 30, 1992, abandoned.--

At [56] References Cited

Foreign Patent Documents, "1120520" should read --1-120520--.

Foreign Patent Documents, "224616" should read --2-24616--.

Column 1

Line 2, Insert: --This application is a continuation of application Ser. No. 08/309,466, filed Sept. 22, 1994, now abandoned, which is a continuation of application Ser. No. 08/229,124, filed April 18, 1994, abandoned, which is a continuation of application Ser. No. 07/875,838, filed April 30, 1992, abandoned.--

Line 19, "direction" should read --detection--.

UNITED STATES PATENT AND TRADEMARK OFFICE
CERTIFICATE OF CORRECTION

PATENT NO. : 5,543,886
DATED : August 6, 1996
INVENTOR(S) : YASUO SUDA

It is certified that error appears in the above-indentified patent and that said Letters Patent is hereby corrected as shown below:

Column 2

Line 8, "lost viewpoint" should read --cost viewpoint,--.

Column 3

Line 40, "part" should read --path--.
    Line 59, "part" should read --path--.
    Line 61, "part" should read --path--.

Column 4

Line 60, "thereto" should read --thereto,--.

Column 6

Line 13, "lapped" should read --lap--.
    Line 39, "a part of" should be deleted.

Column 8

Line 1, "of" should read --of the--.

Column 9

Line 6, "of" (first occurrence) should read --in--.
    Line 18, "seondary" should read --secondary--.
    Line 36, "on" should read --of--.

UNITED STATES PATENT AND TRADEMARK OFFICE
CERTIFICATE OF CORRECTION

PATENT NO. : 5,543,886
DATED : August 6, 1996
INVENTOR(S) : YASUO SUDA

It is certified that error appears in the above-indentified patent and that said Letters Patent is hereby corrected as shown below:

Column 10

Line 31, "intersect" should read --intersects--.

Column 12

Line 3, "a" should read --an--.
Line 24, "and" should read --to--.
Line 48, "being" should read --being a--.

Column 13

Line 5, "form" should read --from--.
Line 19, "and" should read --and at --.

Column 14

Line 55, "steps" should read --steps is--.

UNITED STATES PATENT AND TRADEMARK OFFICE
CERTIFICATE OF CORRECTION

PATENT NO. : 5,543,886  
DATED : August 6, 1996  
INVENTOR(S) : YASUO SUDA

It is certified that error appears in the above-indentified patent and that said Letters Patent is hereby corrected as shown below:

Column 15

Line 42, "images" should read --image--.

Column 16

Line 59, "and" should read --and the--.

Signed and Sealed this

Thirty-first Day of December, 1996

Attest:

BRUCE LEHMAN

*Attesting Officer*  Commissioner of Patents and Trademarks